United States Patent Office 3,649,632
Patented Mar. 14, 1972

3,649,632
3,4-DIHYDROACRIDIN-2-(1H)-ONE DERIVATIVES
James L. Diebold, Delaware, and Milton Wolf, Chester, Pa., assignors to American Home Products Corporation, New York, N.Y.
No Drawing. Filed Jan. 27, 1970, Ser. No. 6,286
Int. Cl. C07d 37/18
U.S. Cl. 260—279 R                               1 Claim

ABSTRACT OF THE DISCLOSURE

The disclosure is directed to novel 3,4-dihydroacridin-2(1H)-one derivatives obtained by the reaction of o-aminocarbonyl derivatives with cyclohexane-1,4-dione in the presence of a strong acid. The compounds are useful as central nervous system depressants in that they produce a calming effect in the host.

---

The invention is directed to novel 3,4-dihydroacridin-2(1H)-one derivatives obtained by the reaction of o-aminocarbonyl derivatives with cyclohexane-1,4-dione in the presence of a strong acid.

The compounds within the purview of the present invention are exemplified by the 3,4-dihydroacridin-2(1H)-one derivatives having the following formula:

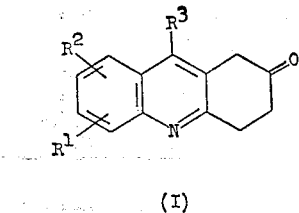

(I)

where $R^1$ and $R^2$ are the same or different members of the group hydrogen, halogen, nitro, lower alkyl, lower alkoxy and trifluoromethyl; and $R^3$ is hydrogen, lower alkyl, phenyl, halophenyl, lower alkylphenyl, lower alkoxyphenyl, trifluoromethylphenyl, pyridyl, thienyl or furyl.

As defined herein, the terms "lower alkyl," "lower alkoxy" and the like, describe groups having from one to four carbon atoms.

A typical example of the compounds of this invention is 7-chloro-3,4-dihydro-9-phenylacridin-2(1H)-one.

The new and useful compounds of this invention may be prepared by the process which is hereinafter schematically illustrated, where $R^1$–$R^3$ are as defined above.

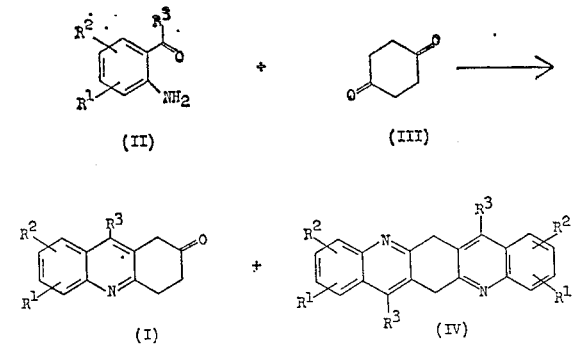

The closest known prior art is G. Kempter and G. Möbius, J. Prakt. Chem. 34, 298–311 (1966), which report the preparation of 1 - oxo-9-methyl-1,2,3,4-tetrahydroacridin and 4-oxo-9-methyl-1,2,3,4-tetrahydroacridin. The compounds of the present invention are distinguished from the prior art, inter alia, by the position of the oxo substitution.

The starting materials used in the preparation of the claimed compounds are generally known or can be prepared by well known procedures. The novel 3,4-dihydroacridin-2(1H)-one derivatives (I) may be prepared by mixing cyclohexane-1,4-dione with an o-aminocarbonyl derivative, such as 2-amino-5-chlorobenzophenone, and a strong acid, such as trifluoroacetic acid, and stirring the mixture at elevated temperatures until the reaction is complete. The strong acid may be any of those useful as understood by those skilled in the art, preferably trifluoroacetic acid, methanesulfonic acid, or the like.

Preferably, the reaction is carried out at reflux temperatures for about 2 to 6 hours. However, lower temperatures may be used with appropriate adjustment in the time of reaction as will be understood by those skilled in the art. When the reaction is complete, the solution is evaporated and the residue dissolved, for instance, in methylene chloride and extracted with an alkaline material, such as dilute sodium hydroxide. The methylene chloride solution is dried over a desiccant, such as anhydrous sodium sulfate, and evaporated giving a solid residue.

Recrystallization of the solid residue from ethyl acetate and then from an alkanol, such as n-propyl alcohol affords an intermediate 6,13-dihydroquino[2,3-b]acridine (IV).

The filtrate from the ethyl acetate recrystallization is evaporated yielding a solid residue. Upon purification by extraction, for instance from ether, and recrystallization, for instance from cyclohexane, the product 3,4-dihydroacridin-2(1H)-one (I) is obtained.

In the pharmacological evaluation of the biological activity of the compounds of this invention, the in vivo effects are tested as follows. The compound is administered orally or intraperitoneally to three mice (14 to 24 grams) at each of the following doses: 400, 127, 40 and 12.7 milligrams per kilogram of host body weight (m.p.k.). The animals are watched for a minimum of two hours during which time signs of general stimulation, (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) are noted.

The compounds of this invention induce central nervous system depressant effects at a dose of 127 to 400 m.p.k.

When the compounds of this invention are employed as described above, they may be administered alone or in combination with pharmacologically acceptable carriers, the proportion of which is determined by the solubility and chemical nature of the compound, chosen route of administration and standard pharmacological practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects.

In order more clearly to disclose the nature of the present invention, specific examples of the practice of the invention are hereinafter given. It should be understood, however, that this is done solely by way of example and is intended neither to delineate the scope of the invention nor limit the ambit of the appended claim. In the examples all temperatures are stated in degrees centigrade, and the following abbreviations are used: "g." for grams, "ml." for milliliters, "mole" for gram molecular weight, and "$\phi$" for phenyl ($C_6H_4$).

EXAMPLE I

The following illustrates the preparation of 7-chloro-3,4-dihydro-9-phenylacridin-2(1H)-one.

A mixture of cyclohexane-1,4-dione (4.0 g., 0.0357 mole) 2-amino-5-chlorobenzophenone (8.25 g., 0.0357 mole) and trifluoroacetic (50 ml.) is stirred and refluxed for four hours. The solution is evaporated and the residue dissolved in methylene chloride and extracted with dilute sodium hydroxide. The methylene chloride solution is dried over anhydrous sodium sulfate and evaporated giving a solid residue. Recrystallization of this material from ethyl acetate and then again from n-propyl alcohol affords 3.5 g. of 2,9-dichloro-6,13-dihydro-7,14-diphenylquino[2,3-b]acridine as a crystalline solid having a melting point of 287–288° C. (uncorrected).

Based on the assumed molecular formula $C_{32}H_{20}Cl_2N_2$, it was calculated that the elemental analysis by weight would be 76.35 percent carbon, 4.01 percent hydrogen and 5.57 percent nitrogen. The product was analyzed and found to contain 75.98 percent carbon, 3.93 percent hydrogen, and 5.63 percent nitrogen which confirmed the accuracy of the assumed formula. This may be expressed:

*Analysis.*—Calcd. for $C_{32}H_{20}Cl_2N_2$ (percent): C, 76.35; H, 4.01; N, 5.57. Found (percent): C, 75.98; H, 3.93; N, 5.63.

The filtrate from the ethyl acetate recrystallization is evaporated yielding a solid residue. This residue is extracted with ether and then recrystallized from cyclohexane affording 0.7 g. of 7-chloro-3,4-dihydro-9-phenyl-acridin-2(1H)-one as a crystalline solid having a melting point of 171–172° C. (uncorrected).

*Analysis.*—Calcd. for $C_{19}H_{14}ClNO$ (percent): C, 74.28; H, 4.58; N, 4.55. Found (percent): C, 74.14; H, 4.60; N, 4.27.

The latter product was tested in the foregoing pharmacological procedure and was found to decrease motor activity and to decrease respiration at a dose of 400 m.p.k. administered intraperitoneally.

Following the procedure of Example I but substituting appropriate starting materials, products having the following substituents may be prepared:

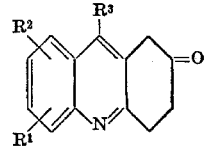

| Example | R¹ | R² | R³ |
|---|---|---|---|
| I | Cl | H | Phenyl |
| I-1 | Br | Cl | o-Cl$\phi$— |
| I-2 | F | NO₂ | m-F$\phi$— |
| I-3 | I | CH₃ | p-I$\phi$— |
| I-4 | H | CH₃O | p-Br$\phi$— |
| I-5 | NO₂ | C₂H₅ | o-CH₃$\phi$— |
| I-6 | CH₃ | C₄H₉ | p-C₂H₅$\phi$— |
| I-7 | C₂H₅ | C₄H₉O— | p-C₃H₇$\phi$— |
| I-8 | C₃H₇ | CF₃ | p-C₃H₇$\phi$— |
| I-9 | C₄H₉ | C₂H₅O | m-CH₃O$\phi$— |
| I-10 | CF₃ | Br | p-C₂H₅O$\phi$— |
| I-11 | CH₃O— | CH₃ | p-C₃H₇O$\phi$— |
| I-12 | C₂H₅O— | H | p-C₄H₉O$\phi$— |
| I-13 | C₃H₇O— | I | CF₃$\phi$— |
| I-14 | C₄H₉O— | CH₃ | C₅H₄N— |
| I-15 | NO₂ | NO₂ | C₄H₃S— |
| I-16 | CF₃ | F | C₄H₃O— |
| I-17 | CH₃— | C₃H₇ | H |
| I-18 | CH₃O— | CH₃ | CH₃ |
| I-19 | C₂H₅O— | CH₃ | C₂H₅ |
| I-20 | C₂H₅— | C₃H₇O— | C₃H₇ |
| I-21 | CH₃— | CB₃— | C₄H₉ |

What is claimed is:
1. 7-chloro-3,4-dihydro-9-phenylacridin-2(1H)-one.

No references cited.

DONALD G. DAUS, Primary Examiner

U.S. Cl. X.R.

260—578, 586 R; 424—257